(12) United States Patent
Bengtsson et al.

(10) Patent No.: US 6,224,533 B1
(45) Date of Patent: *May 1, 2001

(54) FLEXIBLE METAL SUPPORTING DEVICE FOR A CENTRIFUGAL SEPARATOR

(75) Inventors: Leif Bengtsson, Huddinge; Staffan Grandin, Hägersten; Jonas Hjelm, Linköping; Kjell Klintenstedt, Saltsjö-Boo; Torbjörn Larsen, Uttran; Nils-Gunnar Ohlson, Nacka; Jan Setterberg, Huddinge, all of (SE)

(73) Assignee: Alfa Laval AB, Tumba (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,541

(22) Filed: Jun. 10, 1998

(30) Foreign Application Priority Data

Jun. 11, 1997 (SE) .................................................. 9702225

(51) Int. Cl.⁷ ...................................................... B04B 9/14
(52) U.S. Cl. .............................................. 494/82; 384/535
(58) Field of Search ................................ 494/12, 38, 43, 494/82–85; 68/23.3; 74/572, 574; 464/81–83, 180; 210/144, 363; 384/535, 536

(56) References Cited

U.S. PATENT DOCUMENTS

| 1,980,580 | * | 11/1934 | Gilmore . |
| 2,015,784 | * | 10/1935 | Brown . |
| 2,149,728 | | 3/1939 | Cronan . |
| 2,487,343 | | 11/1949 | Kopf . |
| 2,534,738 | * | 12/1950 | Scott . |
| 2,698,131 | * | 12/1954 | Cook . |
| 2,827,229 | * | 3/1958 | Blum . |
| 2,906,572 | * | 9/1959 | Wroby . |

(List continued on next page.)

FOREIGN PATENT DOCUMENTS

| 366938 | | 1/1923 | (DE) . | |
| 558937 | | 9/1932 | (DE) . | |
| 2 020 178 | | 11/1971 | (DE) . | |
| 3414774 | * | 10/1984 | (DE) | ..................................... 494/83 |
| 196 10 692 | | 9/1997 | (DE) . | |
| 0 389 647 | | 10/1990 | (EP) . | |
| 578 710 | | 10/1924 | (FR) . | |
| 1341341 | | 9/1963 | (FR) . | |
| 2 062 799 | | 6/1971 | (FR) . | |
| 2 182 597 | | 12/1973 | (FR) . | |
| 9002 | | of 1914 | (GB) . | |
| 694678 | * | 7/1953 | (GB) | ..................................... 494/82 |
| 937957 | | 9/1963 | (GB) . | |
| 1 397 172 | | 6/1975 | (GB) . | |
| 6618 | | 1/1896 | (SE) . | |
| 54165 | | 3/1923 | (SE) . | |
| 89/10794 | * | 11/1989 | (WO) . | |

*Primary Examiner*—Charles E. Cooley
(74) *Attorney, Agent, or Firm*—Fish & Richardson P.C.

(57) ABSTRACT

A flexible metal support device for a rotatable centrifuge rotor (2) provided in a frame member (1) by a bearing member (4). The support device comprises a support element (7) provided between the bearing member (4) and the frame member (1), and arranged to absorb relative movements between the centrifuge rotor and the frame member. The support element (7) comprises an inner mounting portion, essentially immovable in relation to the bearing member (4), and an outer mounting portion, essentially immovable in relation to the frame member (1). Moreover, the support element (7) comprises three flexible connecting portions which each extends between the inner and outer mounting portions and is arranged to absorb radial and axial relative movements between the centrifuge rotor and the frame member. Furthermore, the inner portion, the connecting portions and the outer portion form an integrated unit manufactured in one piece of metal material.

9 Claims, 5 Drawing Sheets

U.S. PATENT DOCUMENTS

| | | | |
|---|---|---|---|
| 3,306,679 | * | 2/1967 | Stokely . |
| 3,606,143 | * | 9/1971 | Stallmann ............................. 494/82 |
| 3,709,570 | | 1/1973 | Galbato . |
| 3,743,365 | | 7/1973 | Kato . |
| 4,334,718 | * | 6/1982 | Hirt et al. ............................ 464/180 |
| 4,384,858 | | 5/1983 | Kronert et al. . |
| 4,568,324 | * | 2/1986 | Williams ............................. 494/82 |
| 4,722,618 | * | 2/1988 | Matsumoto et al. ................. 384/536 |
| 4,734,079 | * | 3/1988 | Viets .................................... 464/180 |
| 4,779,483 | * | 10/1988 | Andra et al. ........................... 74/574 |
| 5,026,341 | * | 6/1991 | Giebeler ................................. 494/82 |
| 5,328,408 | * | 7/1994 | Wolf et al. ........................... 464/180 |
| 5,342,282 | * | 8/1994 | Letourneur ............................ 494/82 |
| 5,407,282 | * | 4/1995 | Bade et al. ........................... 384/536 |
| 5,573,461 | * | 11/1996 | Colford .................................. 74/574 |
| 5,848,959 | * | 12/1998 | Droste et al. ......................... 494/83 |
| 5,971,908 | * | 10/1999 | Scheuber et al. ..................... 494/84 |

\* cited by examiner

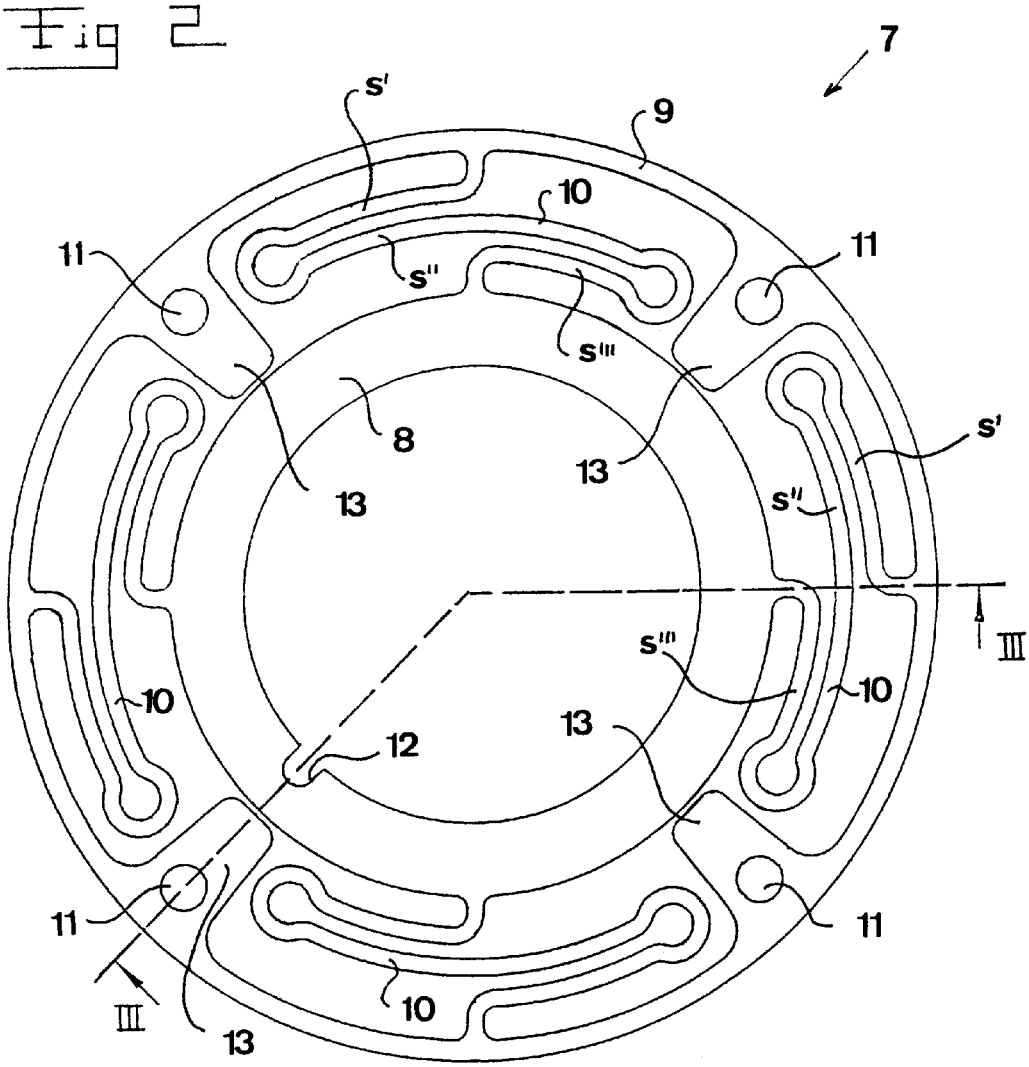
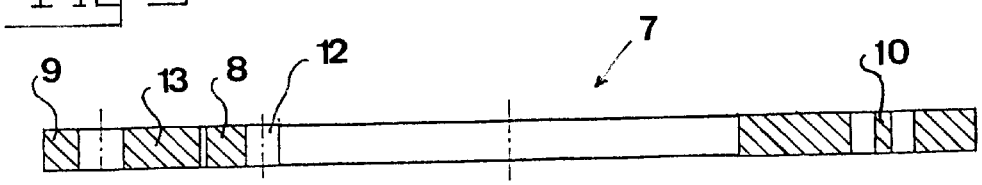

FLEXIBLE METAL SUPPORTING DEVICE FOR A CENTRIFUGAL SEPARATOR

THE BACKGROUND OF THE INVENTION AND PRIOR ART

The present invention refers to a support device for a centrifugal separator having a centrifuge rotor, which is provided in a frame member to be rotatable about an axis of rotation by means of a bearing member, said support device comprising a support element provided between the bearing member and the frame member and arranged to absorb relative movements between the centrifuge rotor and the frame member, said support element comprising an inner mounting portion, which is arranged to be essentially immovable in relation to the bearing member, and an outer mounting portion, which is arranged to be essentially immovable in relation to the frame member.

The present invention will be described in connection with a so called upper bearing support of a centrifugal separator. However, it is to be noted that the invention is applicable also to other bearing supports of centrifugal separators. Such conventional bearing supports are essentially of two types, namely bearing supports in which springs apply a force to friction buffers and bearing supports in which a dampening rubber element is included.

These known bearing supports comprise many details making them complicated and expensive. The dampening properties of the friction buffers and of the rubber elements are difficult to calculate. On the friction surfaces being dampened through friction, coatings (coke) are formed, which change the dampening properties and result in a great risk of jamming. The dampening properties of the rubber material are difficult to predict and change over the time. In the friction buffers, wear particles are formed, which reduce the working life of the bearing support. The heat transfer is poor in these known bearing supports, since rubber has a low heat conducting capability and the friction surfaces of the friction buffers deteriorates the heat transfer.

WO 89/10794 discloses an example of such a known bearing support for a centrifugal separator having a centrifuge rotor which is rotatable in a frame member by means of a bearing member. The bearing support comprises a number of support elements which extend radially outwardly from the bearing member and which each encloses a spring member of a helical spring type. These support elements are arranged to permit relative radial movements between the centrifuge rotor and the frame member by being moveable in a hole of the frame member. The friction, which exists between the contact surfaces of the support element and adjacent elements, results in a dampening of the radial movement and a heat development, which is of course not desirable. U.S. Pat. No. 2,487,343 discloses such a similar bearing support which in addition comprises a number of spring members extending axially and thus being arranged to permit axial relative movements between the centrifuge rotor and the frame member. DE-C-558 937 and GB-C-9002 disclose further examples of known bearing supports having helical springs extending in a radial direction. These known bearing supports have a highly complicated construction with a great number of components included, which of course makes the manufacture and the mounting of the bearing supports labor intensive and expensive, and in addition makes it difficult to transfer heat away from the bearing member.

GB-A-1 397 172 discloses a support device of the type initially defined for a centrifugal separator with a centrifuge rotor which is provided in a frame member to be rotatable about a rotational axis by means of a bearing member. The support element of this known support device comprises a first group of at least three elastic components which are arranged to oscillate merely in radial direction with respect to the rotational axis, a second group of at least three elastic components which are arranged to oscillate merely in an axial direction, and a rigid member connecting the elastic components of the first and second groups. Certainly, the known support element may be manufactured as an integrated unit but it has a highly complicated shape since it requires different components for different functions. Furthermore, the axial extension of the known support element is relatively long.

SE-C-54 165 discloses another type of support element for a centrifugal separator, which is provided between a frame member and a bearing bushing for a rotating shaft. The support element is designed as a plane or corrugated membrane and arranged to permit an oscillating movement of the bearing bushing and the shaft, at the same time as a radial relative movement between the frame member and the bearing bushing is excluded.

SUMMARY OF THE INVENTION

The object of the present invention is to provided a constructively simple support device arranged to permit axial, radial and oscillating movements of a centrifuge rotor in a centrifugal separator. Furthermore, it is aimed at an effective heat transfer of the support device.

This object is obtained by the support device initially defined and characterized in that the support element comprises at least three flexible connecting portions which each extends between the inner mounting portion and the outer mounting portion, each connecting portion is arranged to permit radial and axial movements between the centrifuge rotor and the frame member, and the inner mounting portion, the connecting portions and the outer mounting portion of the support element form an integrated unit manufactured in one single piece of material.

Due to the features that each connecting portion permits axial as well as radial relative movements between the inner and outer mounting portions of the support element, i.e. between the frame member and the centrifuge rotor, and that each connecting portion proper comprises both these functions, a significantly simplified design of the support device is obtained in comparison with previously known techniques, such as the one disclosed in for instance GB-A-1 397 172 mentioned above. Furthermore, such an integrated unit enables a simple structure of the support device from a constructive and a manufacturing point of view. In addition, the support element may be arranged to permit relative oscillating movements between the centrifuge rotor and the frame member. In such a manner, a fully flexible support device is obtained for a centrifuge rotor which thus is permitted to oscillate or pivot, and to move axially and radially in its support in the frame member of the centrifugal separator.

According to a further embodiment of the invention, said integrated unit is cut from said single piece of material. Such a cutting may be performed by any suitable known working method, for instance plasma cutting, water cutting or laser cutting. In relation to other cutting methods, such working methods result in a high surface finish, which is important in order to avoid fractures in the material. A piece of material may comprise a metal sheet material, which may be essentially planar or curved in such a manner that it forms for instance a S- or C-like shape, seen in an axial section through the support element. By such a support element of metal, which extends in one piece between the bearing member and the frame member, an effective heat conducting capability may be obtained for removing the heat formed in the bearing member.

According to a further embodiment of the invention, each of the inner and outer mounting portions has an annular shape, each connecting portion extending from the inner mounting portion to the outer mounting portion along a non-linear path. By such a non-linear extension elastic, resilient properties of the connecting portions are obtained. Such an elastic connecting element permits the bearing to follow the oscillating or pivoting movements of the centrifuge rotor against a centering spring force, which may be calculated in an easy manner. By varying the non-linear extension one may obtain desired resilient and dampening properties in different directions.

According to a further embodiment of the invention, each connecting portion has such a length that the material tensions (that is, stresses) of the connecting portion always are lower than the fatigue limit of the material. Thereby, a long working life of the support element is ensured.

According to a further embodiment of the invention, the connecting portions are arranged at a distance from each other in such a manner that a space is formed therebetween. Advantageously, an element having a dampening material may be provided in said space. This material may comprise at least one of natural rubber, synthetic rubber and any similar material. By for instance such a rubber element, it is possible to dampen the oscillating movements of the centrifuge rotor, which is essential when passing the critical number of revolutions and when a great radial amplitude arises. Advantageously, the distance between adjacent connecting portions is essentially uniform seen in a peripheral direction of the support element.

BRIEF DESCRIPTION OF THE DRAWINGS

The present invention is now to be explained more closely by means of different embodiments described by way of example and with reference to the drawings attached, in which FIG. 1 discloses a schematical sectional view of a part of a centrifugal separator having a support device according to the present invention.

FIG. 2 discloses a view from above of a support element according to a first embodiment of the invention.

FIG. 3 discloses a sectional view of a support element along a line III—III in FIG. 2.

DETAILED DESCRIPTION OF DIFFERENT EMBODIMENTS

Figure 1:
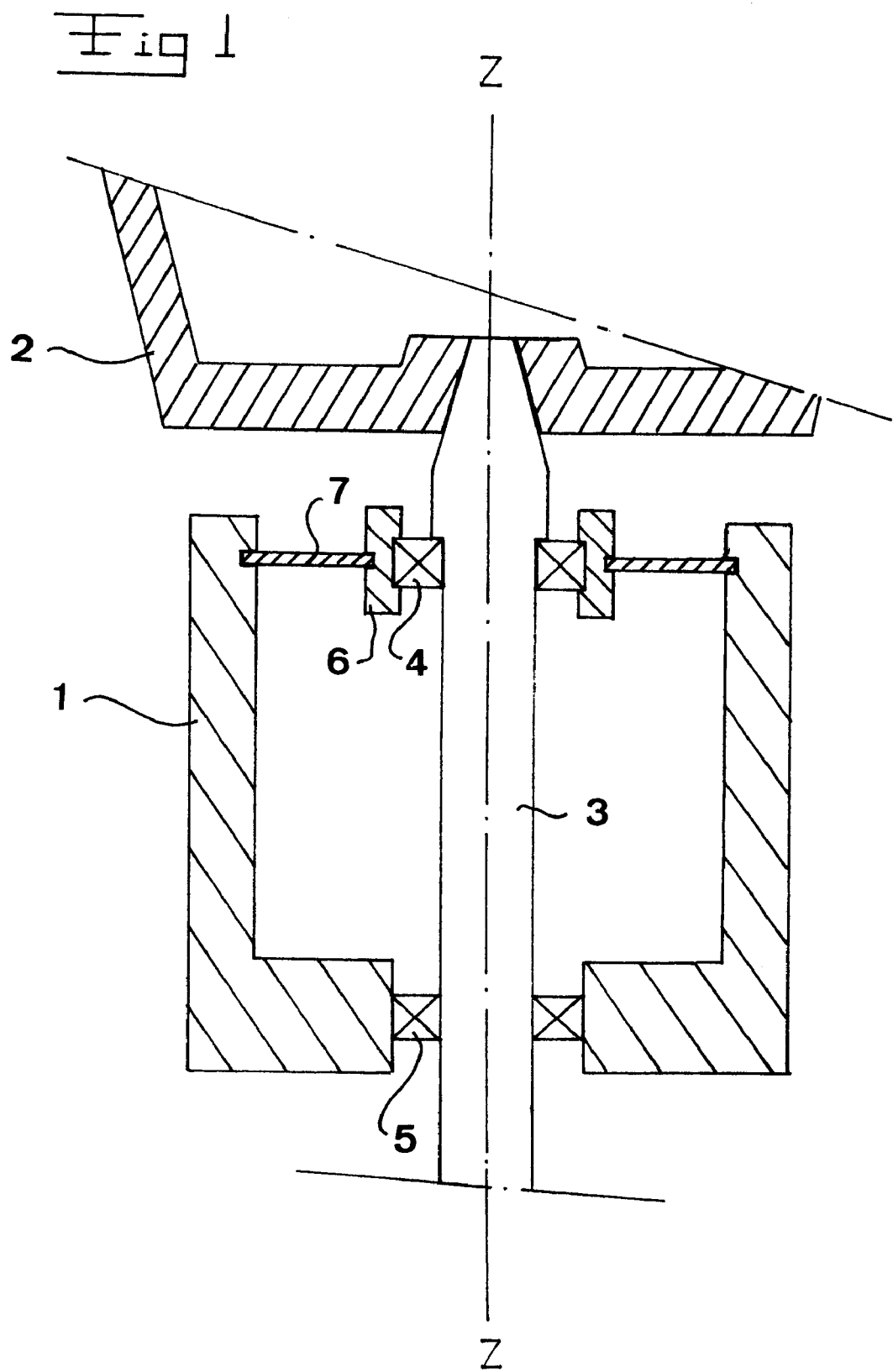

FIG. 1 discloses schematically a part of a centrifugal separator comprising a frame member 1 and a centrifuge rotor 2 which is fixedly connected to a rotor shaft 3. The centrifuge rotor 2 and the rotor shaft 3 are provided in the frame member 1 to be rotatable about a rotational axis z by means of an upper bearing 4 and a lower bearing 5. The lower bearing 5 is in direct contact with the rotor shaft 3 and the frame member 1, whereas the upper bearing 4 abuts the rotor shaft 3 by an inner bearing ring and abuts a bearing housing 6 by an outer bearing ring. The bearing housing 6 is connected to the frame member 1 by means of a support element 7 in accordance with the present invention. Thus, the upper bearing 4 is essentially immovable in relation to the rotor shaft 3 and in relation to the bearing housing 6. Consequently, movements of the rotor shaft 3 will be transferred to the support element 7 which is designed in such a manner that it permits small relative movements between the frame member 1 and the bearing housing 6, i.e. the rotor shaft 3. The support element 7 is now to be explained more closely with reference to FIGS. 2–7.

FIG. 2 discloses a first embodiment of the support element 7. The support element 7 comprises a first annular inner mounting portion 8, a second annular outer mounting portion 9 and four connecting portions 10 which extend between and connect the inner mounting portion 8 to the outer mounting portion 9. Furthermore, the support element 7 comprises four mounting holes 11 for the mounting of the support element 7 to the frame member 1, and a recess 12 for defining the position of the support element 7 about the bearing housing 6. Each connecting portion 10 extends in a non-linear path and in the example disclosed in a S-shaped path with a first outer leg s', a second intermediate leg s" and a third inner leg s''', which extend essentially in parallel to each other. The support element 7 is manufactured from one single piece of material of metal, preferably steel having appropriate elastic and dampening properties, and has been produced from a sheet material by means of any suitable cutting method, for instance laser cutting, plasma cutting or water cutting. In the embodiment disclosed, the support element 7 has an essentially plane shape, see FIG. 3. It is to be noted, however, that the support element 7, seen in a sectional view as in FIG. 3, also may have a curved shape. The connecting portions 10 permit the inner mounting portion 8 to move in relation to the outer mounting portion 9, i.e. that the rotor shaft 3 moves in relation to the frame member 1. The configuration disclosed permits radial as well as axial relative movements, and also oscillating or pivoting movements of the rotor shaft 3 in relation to the frame member 1. Furthermore, the support element 7 comprises four stop members 13 determining the maximum amplitude of the radial relative movements. The four connecting portions 10 all have an essentially identical shape and are provided at an essentially uniform distance from each other, i.e. the distance between corresponding points of each connecting elements 10 is about 90° in the example disclosed.

Figure 4:
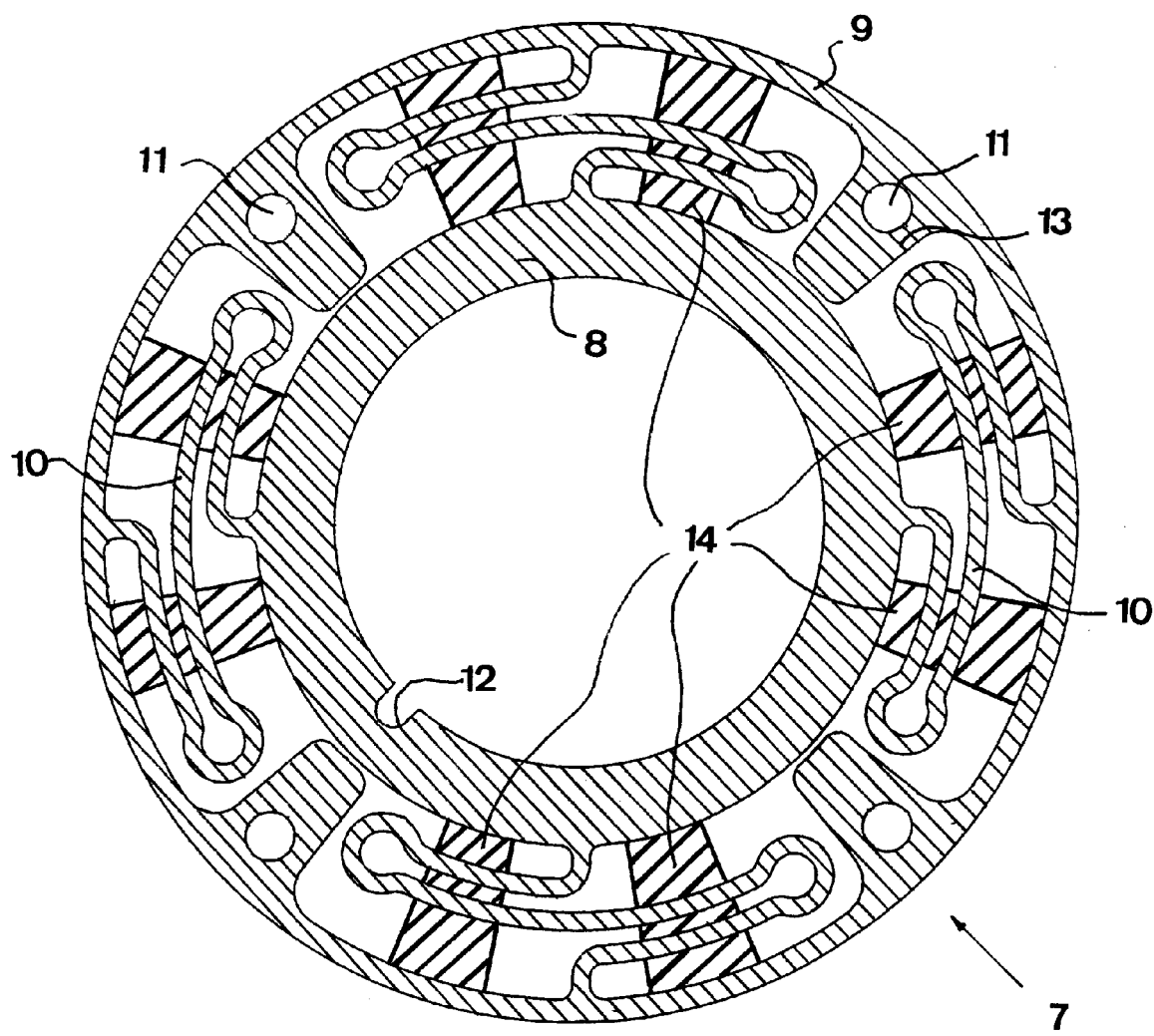
FIG. 4 discloses a sectional view of a support element according to a second embodiment of the invention.

FIG. 4 discloses a second embodiment of the support element 7 according to the invention, which differs from the first embodiment merely in that dampening elements 14 are provided in the spaces formed between the inner mounting portion 8, the outer mounting portion 9 and the connections portions 10. The dampening elements 14 comprise any rubberlike material, for instance synthetic rubber or natural rubber, and have been attached to the inner mounting portion 8, the outer mounting portion 9 and the connecting portion 10 by any suitable attachment method, for instance vulcanizing. In the example disclosed, the dampening elements 14 have a relatively limited extension in the peripheral direction but it is to be noted that the dampening elements 14 may extend over a greater area and in the extreme case fill the whole space between each connecting portion 10.

Figure 5:
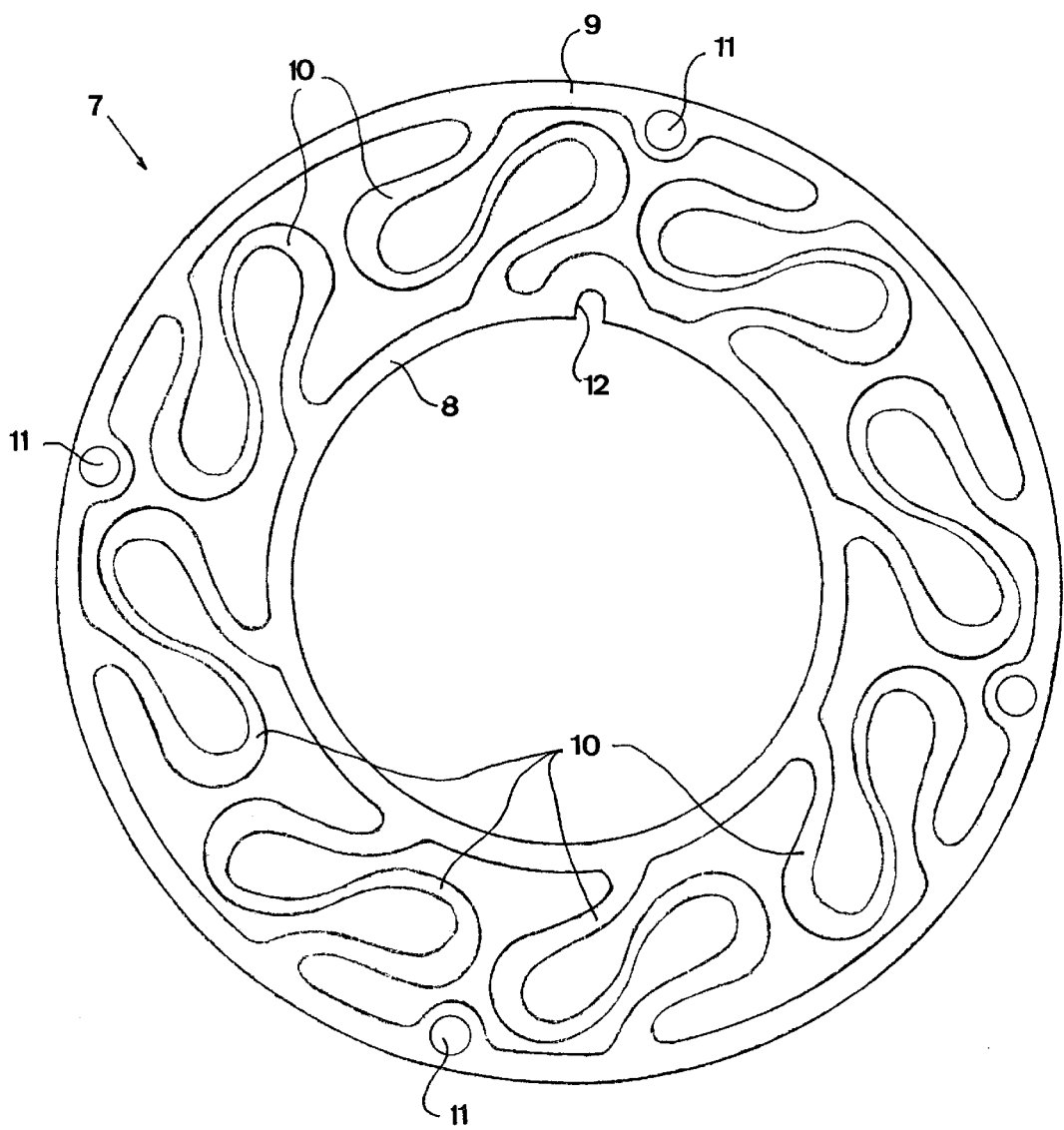
FIG. 5 discloses a view from above of a support element according to a third embodiment of the invention.

FIG. 5 discloses a third embodiment of the support element 7 according to the invention, which differs from the two first embodiments in that the support element 7 has no stop members and in that the connecting portions 10 are eight and have a somewhat different S-shape.

Figure 6:
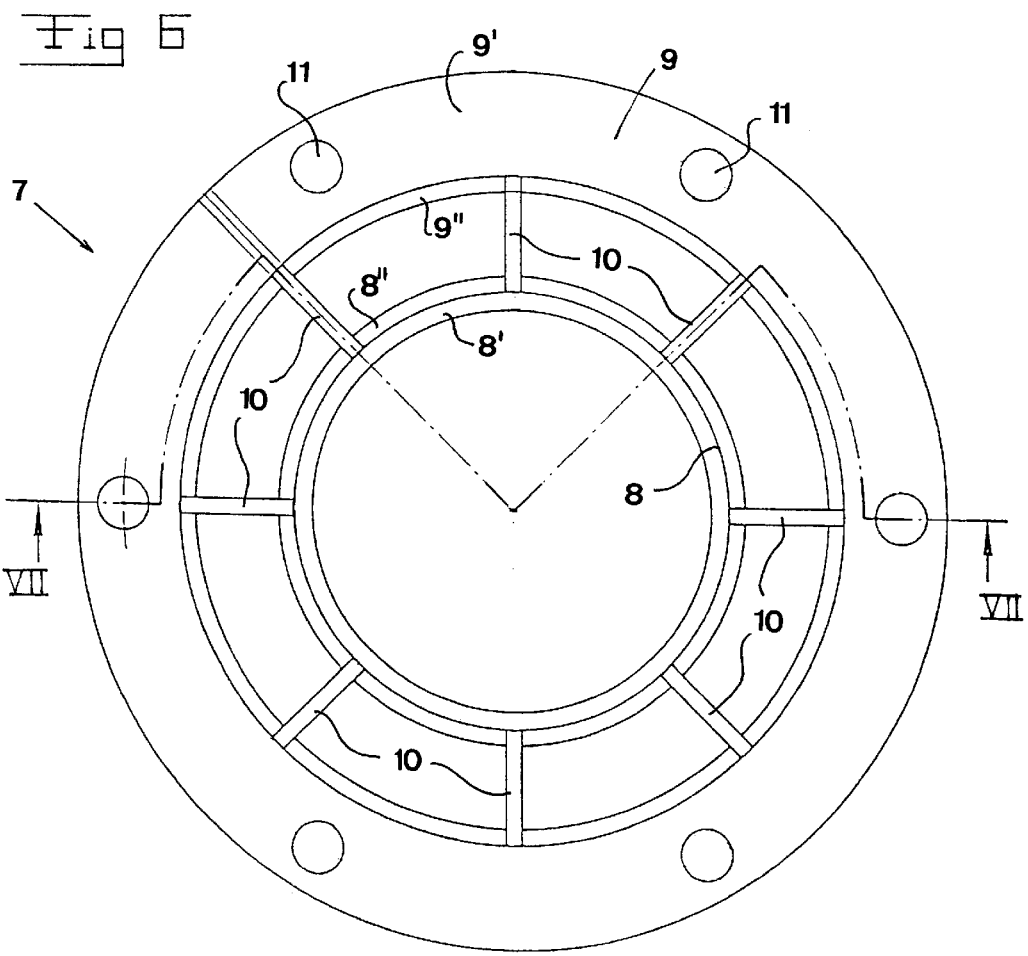
FIG. 6 discloses a view from above of a support element according to a fourth embodiment of the invention.
Figure 7:
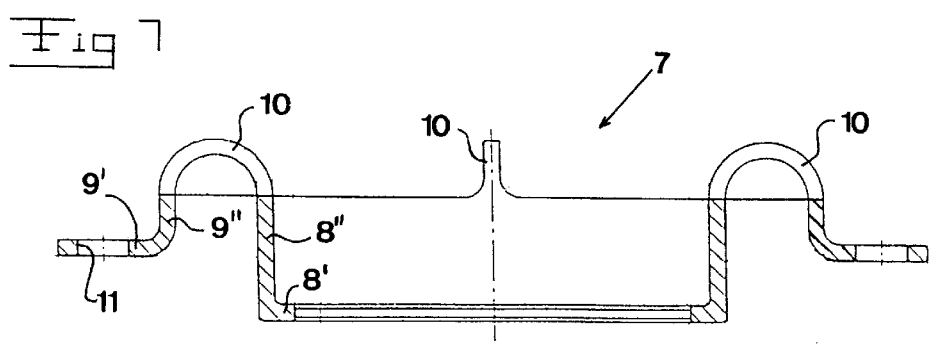
FIG. 7 discloses a sectional view of a support element along the line VII—VII in FIG. 6.

FIGS. 6 and 7 disclose a fourth embodiment of the invention, according to which the connecting portions 10 extend essentially linearly seen in a radial section (FIG. 6) and in a curved non-linear path seen in an axial section (FIG. 7). In the fourth embodiment, the inner connecting portion 8 comprises an inner essentially plane part 8' and an outer essentially circular cylindrical part 8". The outer mounting portion 9 comprises an outer essentially plane part 9' and an inner essentially circular cylindrical part 9". The connecting portions 10 extend in an U-shape between the circular cylindrical parts 8" and 9". Also by such a design of the support element 7, axial and radial relative movements as well as relative oscillating movements will be permitted between the rotor shaft 3 and the frame member 1.

The present invention is not limited to the embodiments disclosed above but may be varied and modified within the scope of the following claims. For instance, it is to be noted that the connecting portions 10 may have any possible, non-linear shapes permitting the connecting portions to extend and compress, respectively, against the action of a spring force.

The invention is applicable to all bearings for supporting a centrifuge rotor and not only to the upper bearing disclosed.

What is claimed is:

1. A centrifugal separator comprising a centrifuge rotor (2), a frame member (1) and a support device, said centrifuge rotor (2) being provided in the frame member (1) to be rotatable about an axis of rotation (z) by means of a bearing member (4), said support device comprising a support element (7) provided between the bearing member (4) and the frame member (1) and arranged to absorb relative movements between the centrifuge rotor (2) and the frame member (1), said support element comprising an inner mounting portion (8), which is arranged to be essentially immovable in relation to the bearing member (4), and an outer mounting portion (9), which is arranged to be essentially immovable in relation to the frame member (1), wherein the support element (7) comprises at least three flexible connecting portions (10) each of which is curved and extends between the inner mounting portion (8) and the outer mounting portion (9), each connecting portion (10) is arranged to permit radial and axial movements between the centrifuge rotor (2) and the frame member (1), and the inner mounting portion (8), the connecting portions (10) and the outer mounting portion (9) of the support element (7) form an integrated unit manufactured in one single piece of a metal material, and wherein each of said connecting portions has such a length that stresses occurring in the connecting portions (10) always are lower than the fatigue limit of the metal.

2. The centrifugal separator according to claim 1, wherein the support element (7) in addition is arranged to permit relative oscillating movements between the centrifuge rotor (2) and the frame member (1).

3. The centrifugal separator according to claim 1, wherein said integrated unit is cut from said piece of a metal material.

4. The centrifugal separator according to claim 3, wherein said piece of a metal material comprises a metal sheet material.

5. The centrifugal separator according to claim 1, wherein the inner mounting portion (8) and outer mounting portion (9) have an annular shape.

6. The centrifugal separator according to claim 1, wherein the connecting portions (10) are arranged at a distance from each other in such a manner that a space is formed therebetween.

7. The centrifugal separator according to claim 6, wherein an element (14) having a dampening material is provide in said space.

8. The centrifugal separator according to claim 7, wherein said dampening material (14) comprises at least one of natural rubber or synthetic rubber.

9. The centrifugal separator according to claim 6, wherein the distance between adjacent connecting portions (10) is essentially uniform seen in a peripheral direction of the support element (7).

* * * * *